(12) United States Patent
Wang et al.

(10) Patent No.: US 10,606,788 B2
(45) Date of Patent: Mar. 31, 2020

(54) USB CHIPSET

(71) Applicant: VIA TECHNOLOGIES, INC., New Taipei (TW)

(72) Inventors: Wei-Yu Wang, New Taipei (TW); Yu-Chung Wei, New Taipei (TW); Yinglien Cheng, New Taipei (TW)

(73) Assignee: VIA LABS, INC., New Taipei (TW)

( * ) Notice: Subject to any disclaimer, the term of this patent is extended or adjusted under 35 U.S.C. 154(b) by 10 days.

(21) Appl. No.: 16/050,103

(22) Filed: Jul. 31, 2018

(65) Prior Publication Data

US 2018/0336156 A1 Nov. 22, 2018

Related U.S. Application Data

(62) Division of application No. 15/059,227, filed on Mar. 2, 2016, now Pat. No. 10,061,735.

(Continued)

(30) Foreign Application Priority Data

Sep. 9, 2015 (TW) .............................. 104129740 A

(51) Int. Cl.
| | | |
|---|---|---|
| *G06F 13/38* | (2006.01) | |
| *G06F 13/40* | (2006.01) | |
| *G06F 13/42* | (2006.01) | |

(52) U.S. Cl.
CPC ...... *G06F 13/4072* (2013.01); *G06F 13/4282* (2013.01); *G06F 13/4295* (2013.01); *G06F 2213/0042* (2013.01)

(58) Field of Classification Search
CPC ................................ G06F 13/38; G06F 13/40
See application file for complete search history.

(56) References Cited

U.S. PATENT DOCUMENTS

| | | |
|---|---|---|
| 7,054,983 B2 | 5/2006 | Mizokuchi et al. |
| 2008/0065927 A1 | 3/2008 | Wu |

(Continued)

FOREIGN PATENT DOCUMENTS

| | | |
|---|---|---|
| CN | 103309711 A | 9/2013 |
| TW | 200301640 | 7/2003 |

(Continued)

OTHER PUBLICATIONS

Chinese language office action dated Mar. 9, 2016, issued in application No. TW 104129740.

(Continued)

*Primary Examiner* — David E Martinez
(74) *Attorney, Agent, or Firm* — McClure, Qualey & Rodack, LLP

(57) ABSTRACT

The USB chipset including a data processing unit, a transmitting unit, a first pin set and a second pin set is provided. The data processing unit generates a plurality of transmission information according to first information provided by a first device. The transmitting unit processes the transmission information to generate an output signal. The first pin set is configured to transmit the output signal to a second device. The second pin set is configured to transmit the output signal to the second device. When the first pin set transmits the output signal to the second device, the second pin set does not transmit the output signal to the second device. When the second pin set transmits the output signal to the second device, the first pin set does not transmit the output signal to the second device.

19 Claims, 9 Drawing Sheets

Related U.S. Application Data

(60) Provisional application No. 62/129,090, filed on Mar. 6, 2015.

(56) References Cited

U.S. PATENT DOCUMENTS

| | | | | |
|---|---|---|---|---|
| 2012/0290761 A1* | 11/2012 | Chen | ............ | G06F 13/4045 710/305 |
| 2015/0055663 A1* | 2/2015 | Quinn | ............ | H04B 10/801 370/535 |
| 2016/0203788 A1* | 7/2016 | Choi | ............ | G09G 5/006 345/520 |

FOREIGN PATENT DOCUMENTS

| | | |
|---|---|---|
| TW | 582152 | 4/2004 |
| TW | 201245966 | 11/2012 |

OTHER PUBLICATIONS

Chinese language office action dated Oct. 26, 2017, issued in application No. TW 106105426.
Chinese language office action dated Oct. 27, 2017, issued in application No. CN 201510776388.9.
"Design of USB Communication System Based on FPGA;" Aug. 2010; pp. 7-17.
English language translation of abstract of "Design of USB Communication System Based on FPGA."

* cited by examiner

USB CHIPSET

CROSS REFERENCE TO RELATED APPLICATIONS

This application is a Divisional of pending U.S. patent application Ser. No. 15/059,227, filed Mar. 2, 2016, now U.S. Pat. No. 10,061,735, which claims the benefit of U.S. Provisional Application No. 62/129,090 filed Mar. 6, 2015 which application is hereby incorporated by reference in its entirety. This Application claims priority of Taiwan Patent Application No. 104129740, filed on Sep. 9, 2015, the entirety of which is incorporated by reference herein.

BACKGROUND OF THE INVENTION

Field of the Invention

The invention relates to a USB chipset, and more particularly to a USB chipset that has internal selecting module applies in a USB type-C field.

Description of the Related Art

As technological developments have progressed, the types of electronic devices available to the consumer have increased. Each of these electronic devices is capable of communicating with a host device via a communication interface. The universal serial bus (USB) is more popular than others.

BRIEF SUMMARY OF THE INVENTION

In accordance with an embodiment, a USB chipset is coupled between a first device and a second device and includes a data processing unit and a transmitting unit. The data processing unit is coupled to the first device and generates a plurality of transmission information according to first information provided by the first device. The transmitting unit is coupled to the data processing unit to transmit the transmission information to the second device and includes a converting module, a first output driving module, a second output driving module and a transmitting-terminal selecting module. The converting module is coupled to the data processing unit to receive the transmission information in parallel and serially outputs the transmission information. The first output driving module is coupled to a first pin set. The second output driving module is coupled to a second pin set. The transmitting-terminal selecting module is coupled between the converting module and the first and second output driving modules.

In accordance with another embodiment, a USB chipset includes a data processing unit, a transmitting unit, a first pin set, and a second pin set. The data processing unit generates a plurality of transmission information according to first information provided by a first device. The transmitting unit processes the transmission information to generate an output signal. The first pin set is configured to transmit the output signal to a second device. The second pin set is configured to transmit the output signal to the second device.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
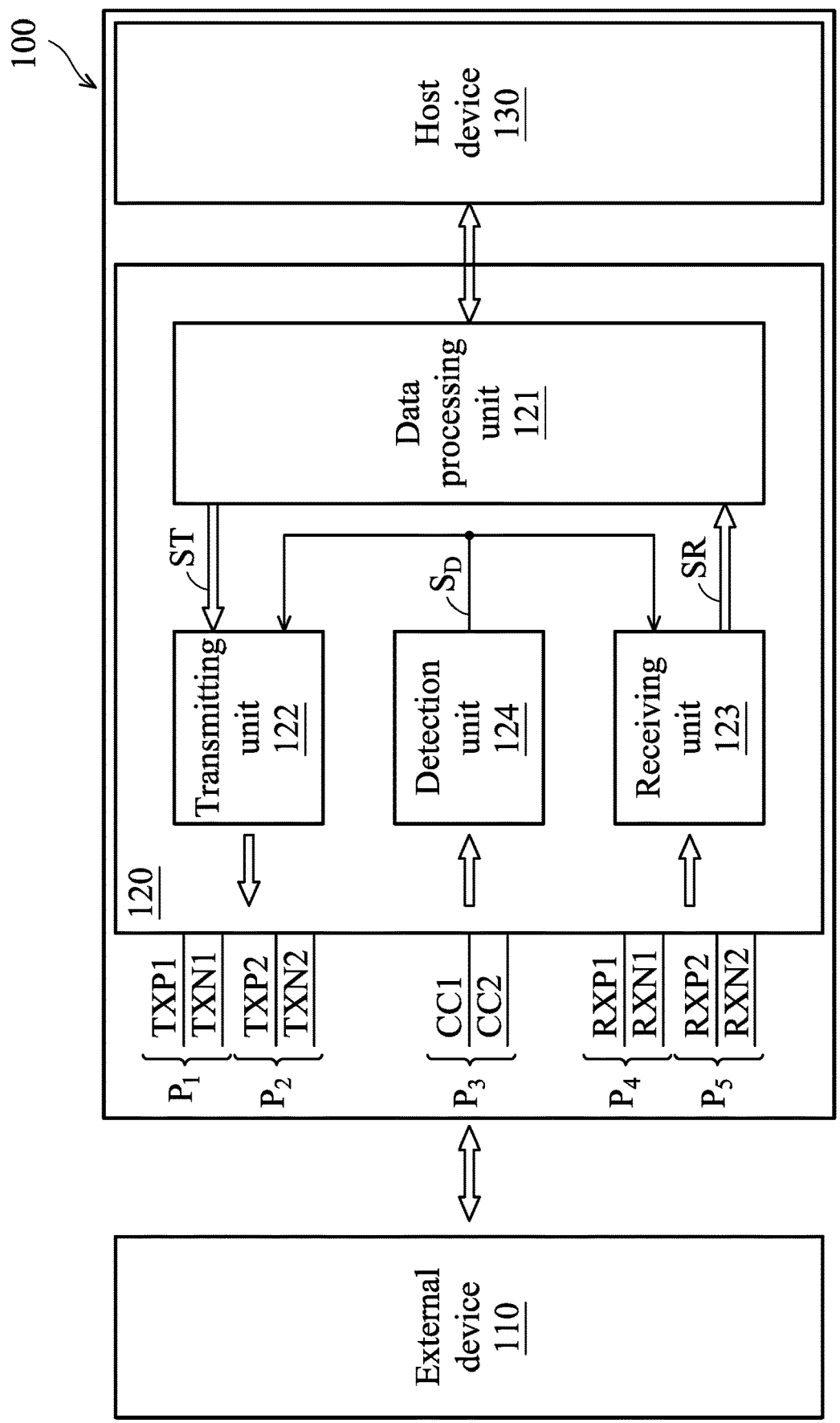
FIG. 1 is a schematic diagram of an exemplary embodiment of an operation system, according to various aspects of the present disclosure.

FIG. 1 is a schematic diagram of an exemplary embodiment of an operation system, according to various aspects of the present disclosure. The operation system 100 includes an external device 110, a USB chipset 120 and a host device 130. The external device 110 receives information provided from the host device 130 or provides information to the host device 130 via the USB chipset 120. Likewise, the host device 130 also receives information provided by the external device 110 or provides information to the external device 110 via the USB chipset 120. As shown in FIG. 1, the USB chipset 120 is combined with the host device 130, but the disclosure is not limited thereto. In other embodiments, the USB chipset 120 is integrated into the external device 110 (not shown in FIG. 1).

The invention does not limit the kind of USB chipset 120. In one embodiment, the USB chipset 120 is a USB 3.0 chipset or a USB 3.1 chipset. As shown in FIG. 1, the chipset 120 includes pin sets $P_1$~$P_5$. The pin sets $P_1$~$P_5$ are configured to couple to the external device 110. The pin set $P_1$ includes pins TXP1 and TXN1 to transmit an output signal to the external device 110. The pin set $P_2$ includes pins TXP2 and TXN2 to transmit an output signal to the external device 110. The pin set $P_3$ includes pins CC1 and CC2. The pin set $P_4$ includes pins RXP1 and RXN1 to receive an input signal provided by the external device 110. The pin set $P_5$ includes pins RXP2 and RXN2 to receive an input signal provided by the external device 110.

In this embodiment, the chipset 120 includes a data processing unit 121, a transmitting unit 122, a receiving unit 123 and a detection unit 124. The data processing unit 121 generates a plurality of transmission information ST according to information provided by the host device 130. The transmitting unit 122 transmits the transmission information ST to generate an output signal and transmits the output signal to the external device 110 via the pin set $P_1$ or the pin set $P_2$. In one embodiment, the transmitting unit 122 includes a de-multiplexer (not shown) to transmit the output signal to the external device 110 via the pin set $P_1$ or the pin set $P_2$.

The receiving unit 123 receives an input signal provided by the external device 110 via the pin set $P_4$ or the pin set $P_5$ and processes the input signal to generate a processed signal SR. The data processing unit 121 generates corresponding receiving information to the host device 130 according to the processed signal SR. In one embodiment, the receiving unit 123 includes a multiplexer (not shown) to receive the input signal received by the pin set $P_4$ or the pin set $P_5$.

The detection unit 124 detects the voltage level of the pin set $P_3$ to control the de-multiplexer of the transmitting unit 122 and the multiplexer of the receiving unit 123. In this embodiment, the transmitting unit 122 selects one of the pin sets $P_1$ and $P_2$ to transmit the output signal according to the detection signal $S_D$ generated by the detection unit 124. The receiving unit 123 selects one of the pin sets $P_4$ and $P_5$ to receive the input signal provided by the external device 110 according to the detection signal $S_D$.

Figure 2A:
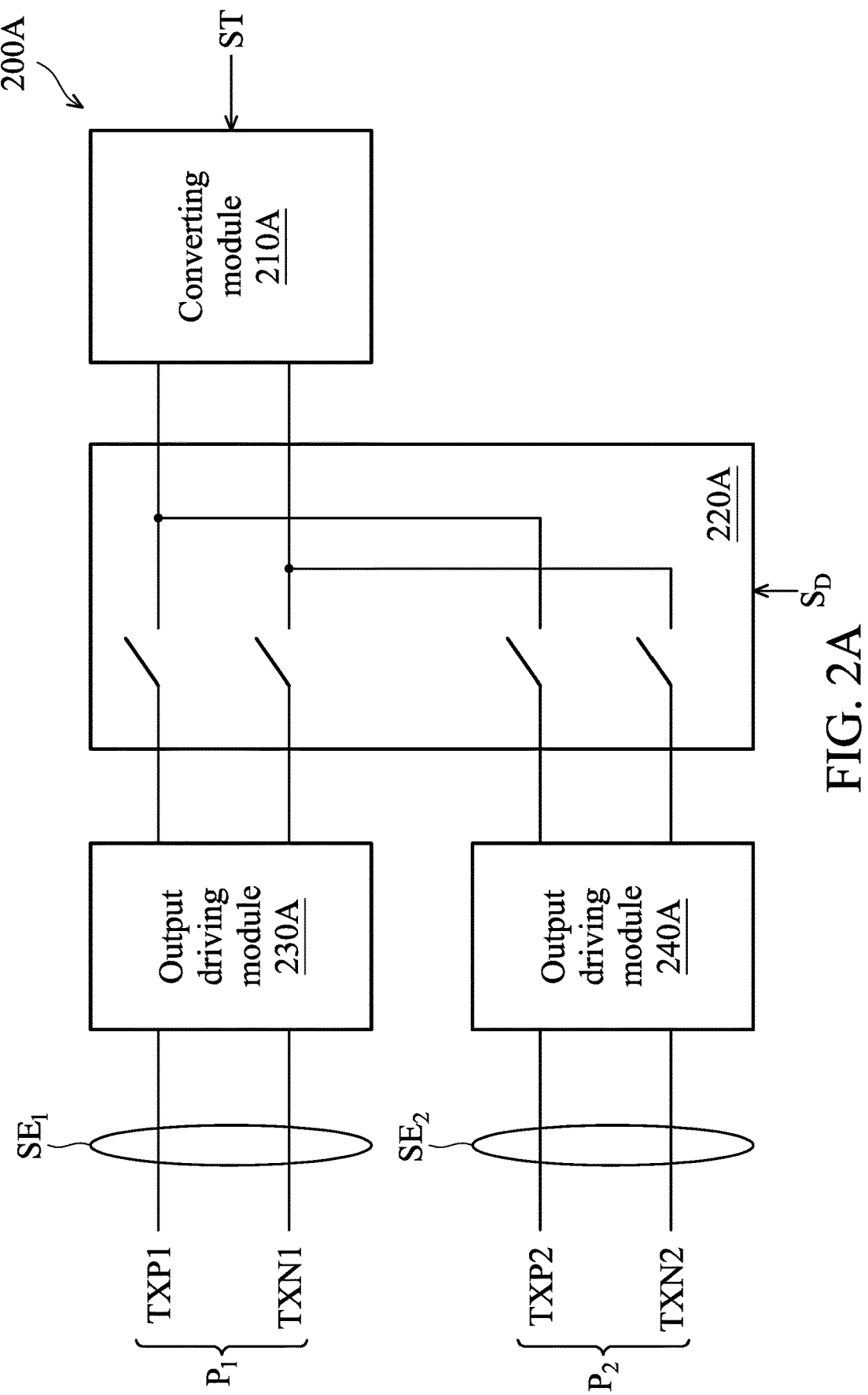
FIGS. 2A~2C are schematic diagrams of exemplary embodiments of a transmitting unit, according to various aspects of the present disclosure.

FIG. 2A is a schematic diagram of an exemplary embodiment of a transmitting unit, according to various aspects of the present disclosure. In this embodiment, the transmitting unit 200A includes a converting module 210A, a transmitting-terminal selecting module 220A, output driving modules 230A and 240A. The converting module 210A receives transmission information ST in parallel and serially output the transmission information ST. In one embodiment, the converting module 210A is a serializer.

The transmitting-terminal selecting module 220A provides the output of the converting module 210A to the output driving module 230A or 240A according to the detection signal $S_D$. In one embodiment, the transmitting-terminal selecting module 220A is a de-multiplexer, but the disclosure is not limited thereto. In other embodiments, the transmitting-terminal selecting module 220A includes at least one transistor or at least one switch.

When the transmitting-terminal selecting module 220A provides the output of the converting module 210A to the output driving module 230A, the output driving module 230A enhances the driving ability of the output information of the converting module 210A to generate an enhanced signal $SE_1$ and outputs the enhanced signal $SE_1$ via the pin set $P_1$. Likewise, when the transmitting-terminal selecting module 220A provides the output of the converting module 210A to the output driving module 240A, the output driving module 240A enhances the driving ability of the output information output from the converting module 210A to generate an enhanced signal $SE_2$ and outputs the enhanced signal $SE_2$ via the pin set $P_2$.

Figure 2B:
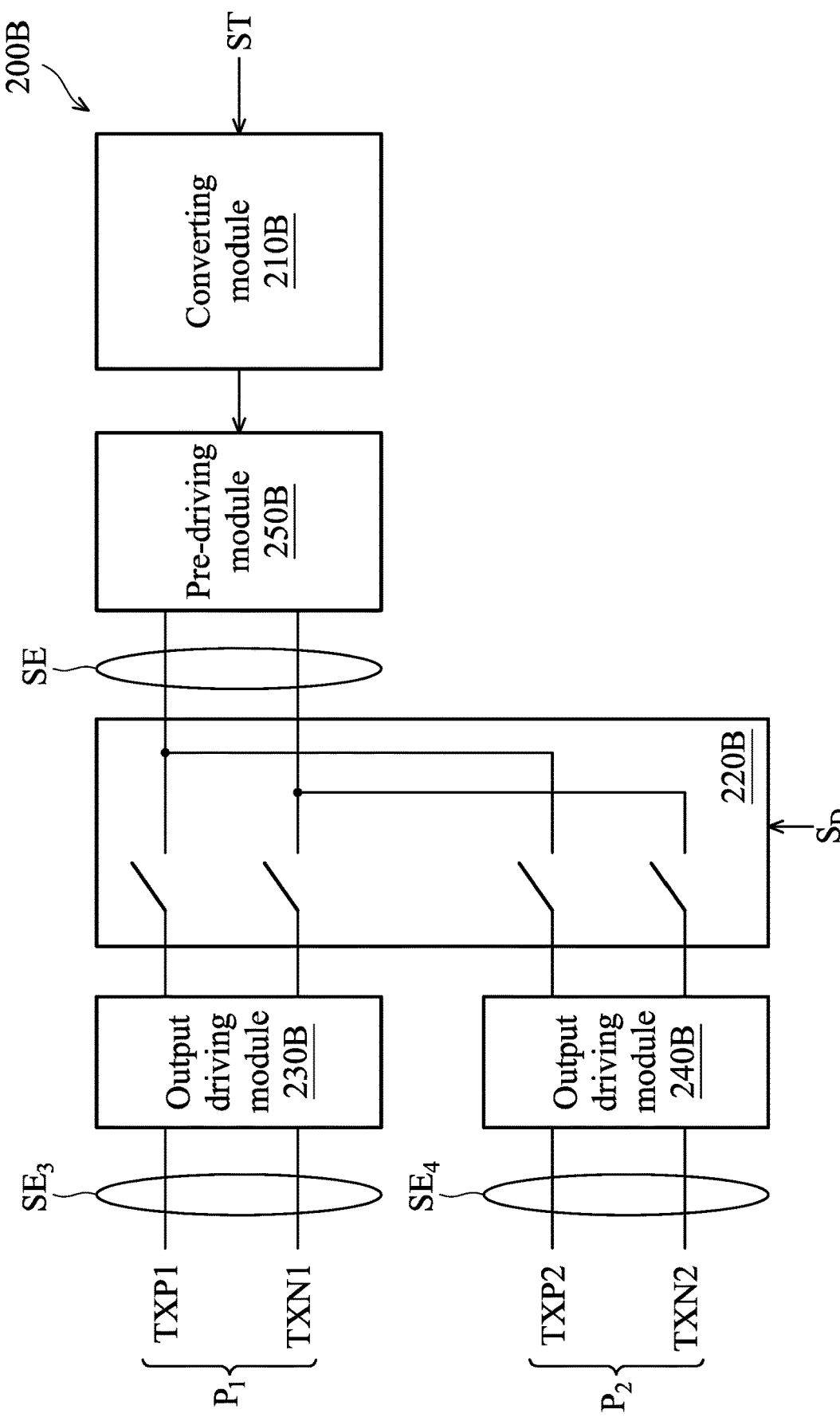

FIG. 2B is a schematic diagram of another exemplary embodiment of the transmitting unit, according to various aspects of the present disclosure. FIG. 2B is similar to FIG. 2A except for the addition of a pre-driving module 250B. The pre-driving module 250B is coupled between the transmitting-terminal selecting module 220B and the converting module 210B. The pre-driving module 250B enhances the driving ability of the output signal provided by the converting module 210B to generate an enhanced signal SE. In one embodiment, the enhanced signal SE is a differential signal. Since the operation of the converting module 210B is the same as the operation of the converting module 210A, the description of the converting module 210B is omitted for brevity.

The transmitting-terminal selecting module 220B provides the enhanced signal SE to the output driving module 230B or 240B according to the detection signal $S_D$. When the transmitting-terminal selecting module 220B provides the enhanced signal SE to the output driving module 230B, the output driving module 230B enhances the driving ability of the enhanced signal SE to generate an enhanced signal $SE_3$ and outputs the enhanced signal $SE_3$ via the pin set $P_1$. Likewise, when the transmitting-terminal selecting module 220B provides the enhanced signal SE to the output driving module 240B, the output driving module 240B enhances the driving ability of the enhanced signal SE to generate an enhanced signal $SE_4$ and outputs the enhanced signal $SE_4$ via the pin set $P_2$.

Figure 2C:
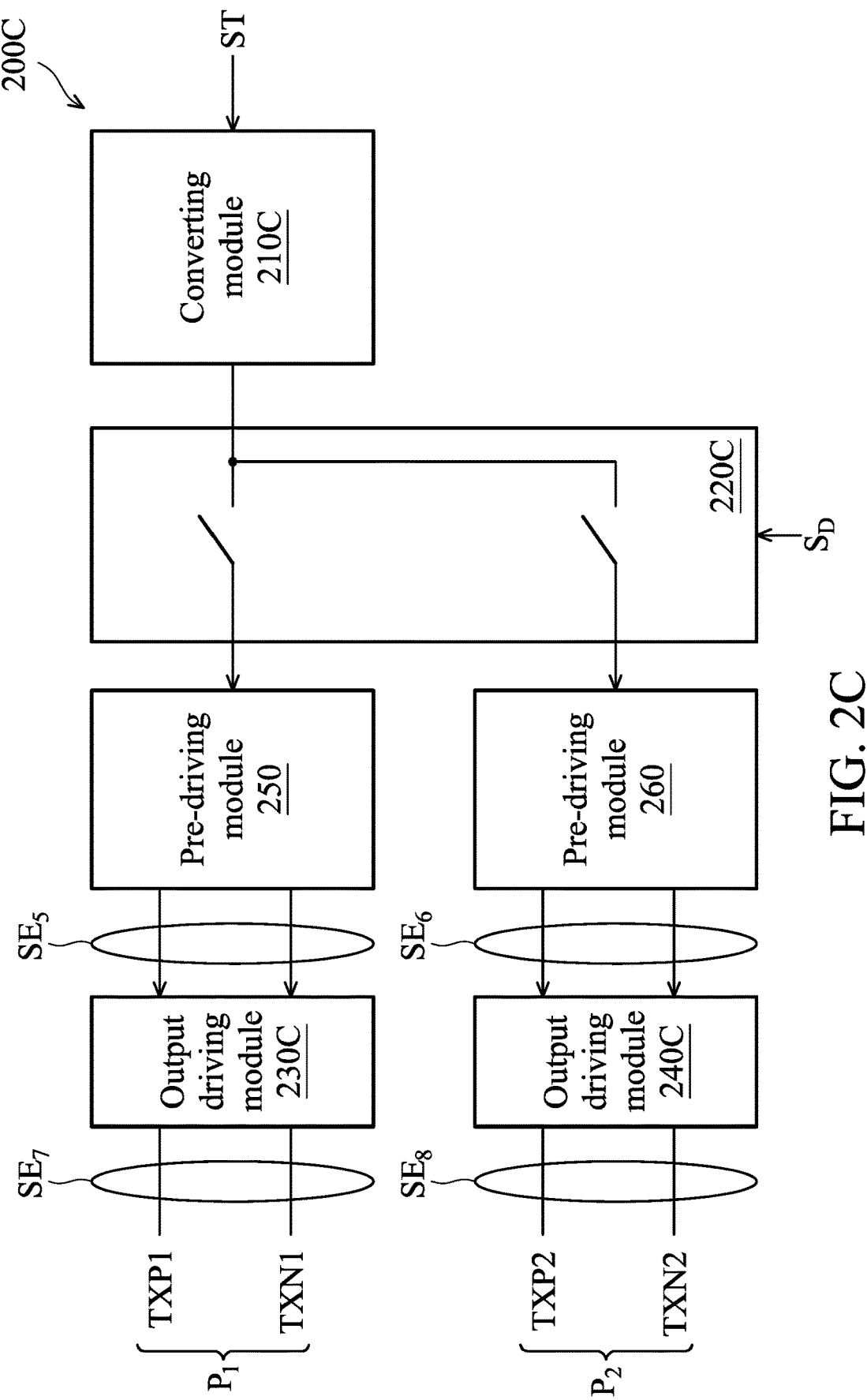

FIG. 2C is a schematic diagram of another exemplary embodiment of the transmitting unit, according to various aspects of the present disclosure. The transmitting-terminal selecting module 220C is coupled between the converting module 210C and the pre-driving modules 250 and 260. Since the operation of the converting module 210C is the same as the operation of the converting module 210A, the description of the converting module 210C is omitted for brevity. In this embodiment, the transmitting-terminal selecting module 220C provides the output of the converting module 210C to the pre-driving module 250 or 260 according to the detection signal $S_D$. In one embodiment, the transmitting-terminal selecting module 220C is a de-multiplexer.

When receiving the output of the converting module 210C, the pre-driving module 250 enhances the driving ability of the output information provided by the converting module 210C to generate an enhanced signal $SE_5$. The output driving module 230C enhances the driving ability of the enhanced signal $SE_5$ to generate an enhanced signal $SE_7$ and provides the enhanced signal $SE_7$ to the external device 110 via the pin set $P_1$. Likewise, when the pre-driving module 260 receives the output of the converting module 210C, the pre-driving module 260 enhances the driving ability of the output of the converting module 210C to generate an enhanced signal $SE_6$. The output driving module 240C enhances the driving ability of the enhanced signal $SE_6$ to generate an enhanced signal $SE_8$ and provides the enhanced signal $SE_8$ to the external device 110 via the pin set $P_2$.

Figure 3A:
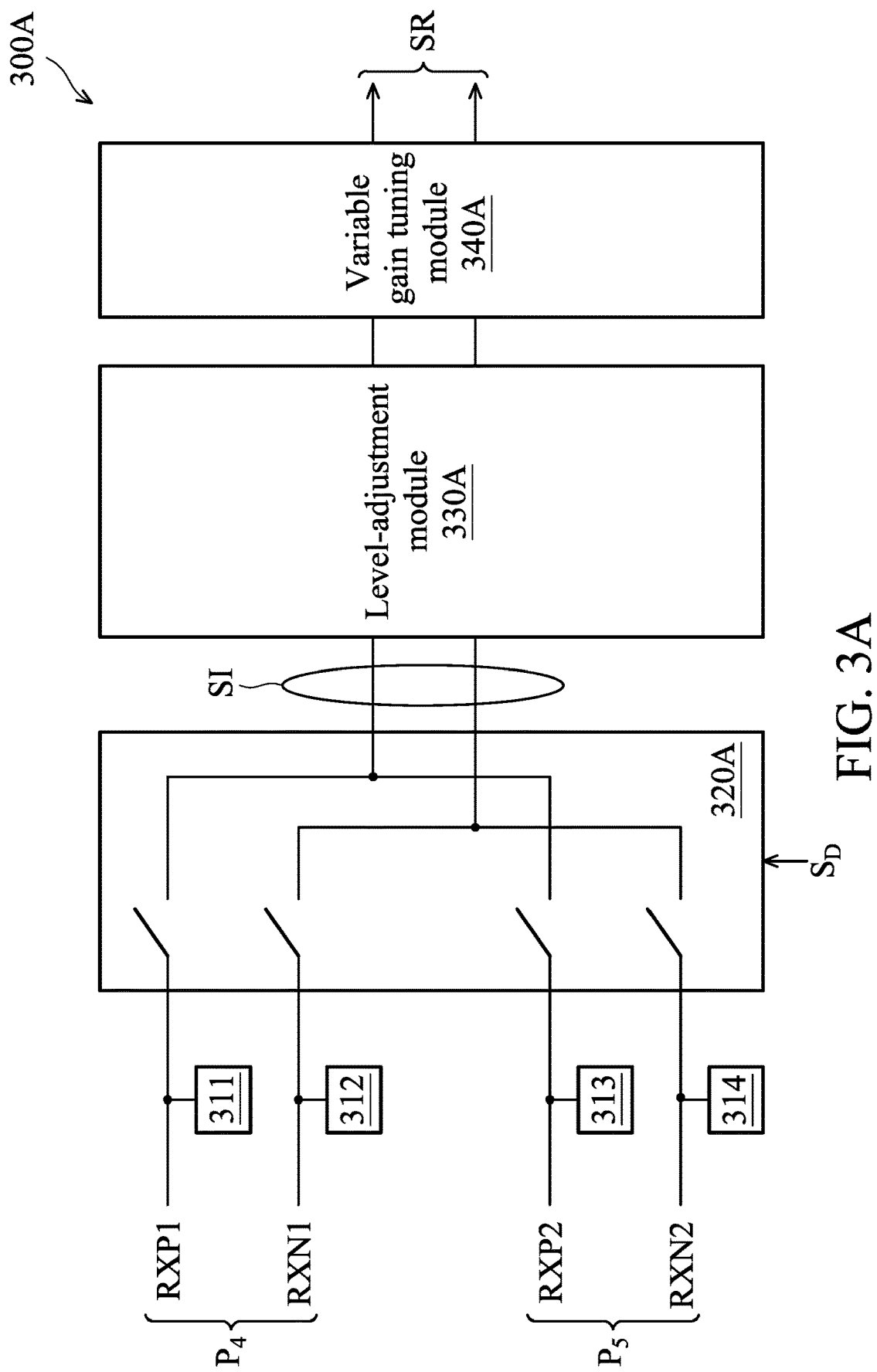
FIGS. 3A~3E schematic diagrams of exemplary embodiments of a receiving unit, according to various aspects of the present disclosure.

FIG. 3A is a schematic diagram of an exemplary embodiment of a receiving unit, according to various aspects of the present disclosure. The receiving unit 300A includes impedance matching terminal modules 311~314, a receiving-terminal selecting module 320A, a level-adjustment module 330A and a variable gain tuning module 340A. The impedance matching terminal modules 311~314 are disposed before the receiving-terminal selecting module 320A. The impedance matching terminal module 311 is coupled to the pin RXP1 to match the impedances of the pin RXP1. The impedance matching terminal module 312 is coupled to the pin RXN1 to match the impedances of the pin RXN1. The impedance matching terminal module 313 is coupled to the pin RXP2 to match the impedances of the pin RXP2. The impedance matching terminal module 314 is coupled to the pin RXN2 to match the impedances of the pin RXN2.

The receiving-terminal selecting module 320A uses the signals received by the pin set $P_4$ or $P_5$ as an input signal SI and transmits the input signal SI to the level-adjustment module 330A according to the detection signal $S_D$. In one embodiment, the receiving-terminal selecting module 320A is a multiplexer, but the disclosure is not limited thereto. In other embodiments, the receiving-terminal selecting module 320A includes at least one transistor.

The level-adjustment module 330A is configured to adjust the level of the common mode of the input signal SI. In one embodiment, the level-adjustment module 330A is a high pass filter or a level shifter. The variable gain tuning module 340A adjusts the outputs of the level-adjustment module 330A to generate a processed signal SR to the data processing unit 121. In one embodiment, the processed signal SR is a differential signal. In another embodiment, the variable gain tuning module 340A is an equalizer or a variable gain amplifier, but the disclosure is not limited thereto.

Figure 3B:
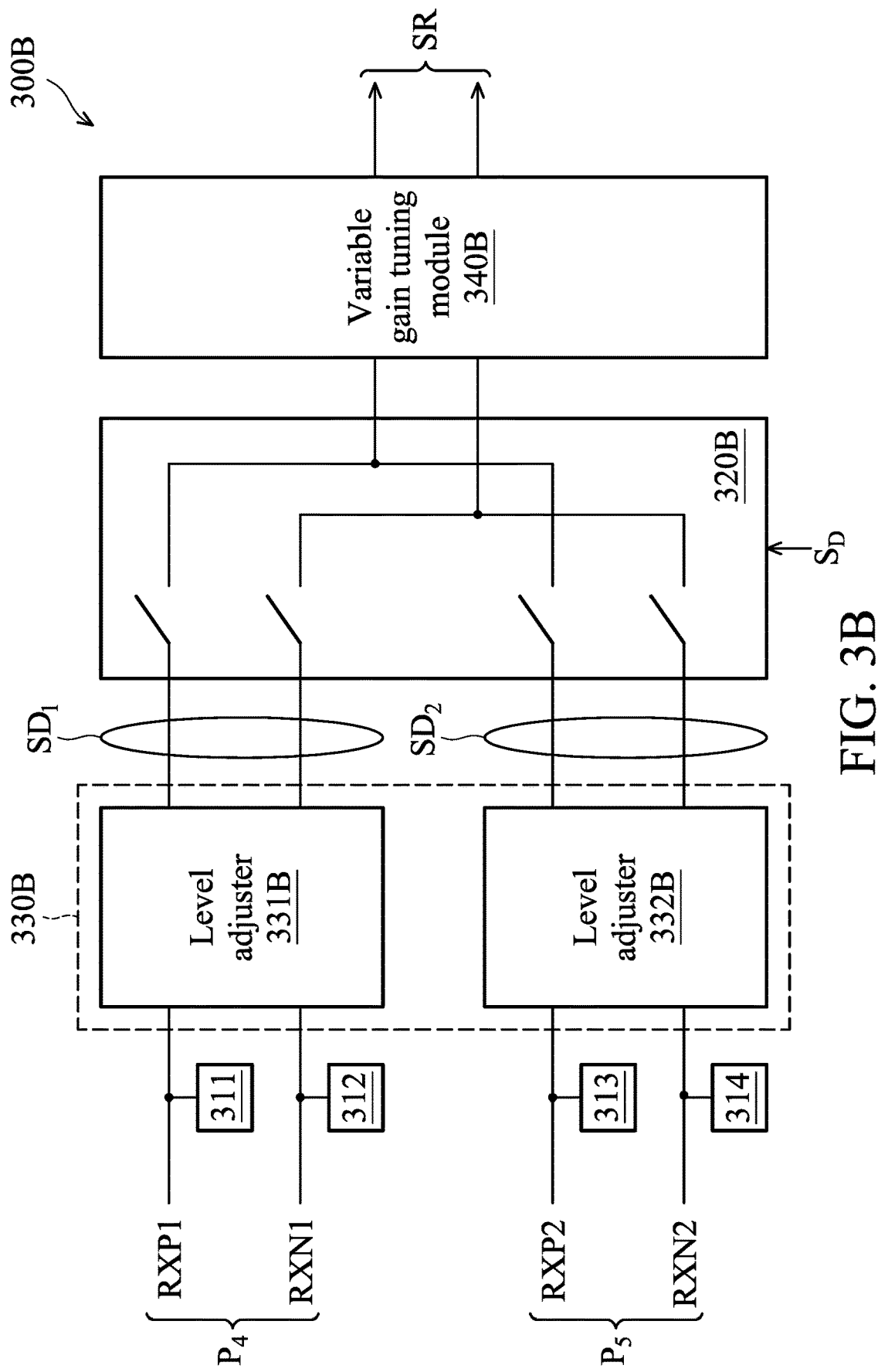

FIG. 3B is a schematic diagram of an exemplary embodiment of the receiving unit, according to various aspects of the present disclosure. FIG. 3B is similar to FIG. 3A except that the receiving-terminal selecting module 320B shown in FIG. 3B is coupled between the level-adjustment module 330B and the variable gain tuning module 340B. In this embodiment, the level-adjustment module 330B includes level adjusters 331B and 332B.

The level adjuster 331B is coupled to the pin set $P_4$ and adjusts the levels of the common voltages of the signals received by the pin set $P_4$ to generate a differential signal $SD_1$. The level adjuster 332B is coupled to the pin set $P_5$ and adjusts the levels of the common voltages of the signals received by the pin set $P_5$ to generate a differential signal $SD_2$. The receiving-terminal selecting module 320B provides the differential signal $SD_1$ or $SD_2$ to the variable gain tuning module 340B according to the detection signal SD. In one embodiment, the receiving-terminal selecting module 320B is a multiplexer. The variable gain tuning module 340B adjusts the outputs of the receiving-terminal selecting module 320B to generate a processed signal SR.

Figure 3C:
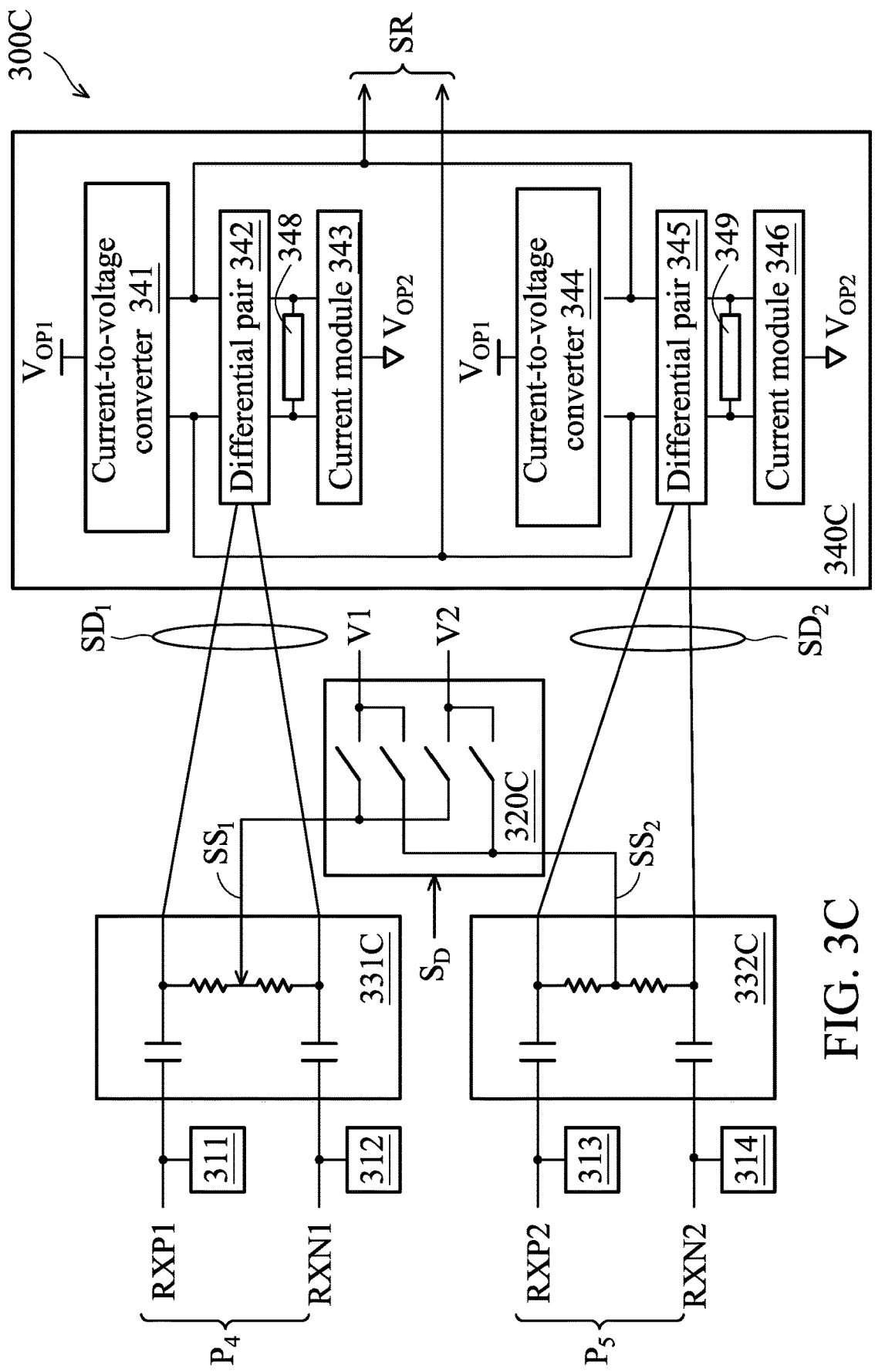

FIG. 3C is a schematic diagram of another exemplary embodiment of the receiving unit, according to various aspects of the present disclosure. The receiving unit 300C includes impedance matching terminal modules 311~314, level-adjustment modules 331C and 332C, a receiving-terminal selecting module 320C and a variable gain tuning module 340C. The level-adjustment module 331C is coupled to the pin set $P_4$ and adjusts the levels of the common voltages of the signals received by the pin set $P_4$ according to a setting value $SS_1$ to generate a differential signal $SD_1$. The level-adjustment module 332C is coupled to the pin set $P_5$ and adjusts the levels of the common voltages of the signals received by the pin set $P_5$ according to a setting value $SS_2$ to generate a differential signal $SD_2$ In one embodiment, the level-adjustment module 331C uses the setting value $SS_1$ as the level of the common voltage of the differential signal $SD_1$, and the level-adjustment module 332C uses the setting value $SS_2$ as the level of the common voltage of the differential signal $SD_2$.

The variable gain tuning module 340C adjusts the output of the level adjustment 331C or 332C to generate the processed signal SR. In one embodiment, the variable gain tuning module 340C adjusts the differential signal $SD_1$ or $SD_2$ according to the level of the common voltage of the differential signal $SD_1$ or $SD_2$. Taking the differential signal $SD_1$ as an example, when the level of the common voltage of the differential signal $SD_1$ is equal to a pre-determined value, the variable gain tuning module 340C does not adjust the differential signal $SD_1$. On the contrary, when the level of the common voltage of the differential signal $SD_1$ is not equal to the pre-determined value, the variable gain tuning module 340C adjusts the differential signal $SD_1$.

In this embodiment, the variable gain tuning module 340C includes current-to-voltage converters 341 and 344, differential pairs 342 and 345, variable resistor units 348 and 349, and current modules 343 and 346, but the disclosure is not limited thereto. As shown in FIG. 3C, the current-to-voltage converter 341, the differential pair 342 and the current module 343 are serially connected with one another between the operation voltages $V_{OP1}$ and $V_{OP2}$. The current module 343 is configured to provide at least two fixed currents. The differential pair 342 processes the differential signal $SD_1$ to generate a differential current according to the current generated by the current module 343. The current-to-voltage converter 341 generates a first differential voltage to serve as the processed signal SR according to the differential current generated by the differential pair 342. The variable resistor unit 348 is coupled between the differential pair 342 and the current module 343. The resistance of the variable resistor unit 348 is changed according to the frequency of the output of the differential pair 342. In one embodiment, the current module 343 includes two current sources. Each current source includes a first terminal coupled to the differential pair 342 and a second terminal receiving the operation voltage $V_{OP2}$. In one embodiment, the operation voltage $V_{OP2}$ is a ground voltage.

Likewise, the current-to-voltage converter 344, the differential pair 345 and the current module 346 are serially connected with one another between the operation voltages $V_{OP1}$ and $V_{OP2}$. The current module 346 is configured to provide at least two fixed currents. The differential pair 345 processes the differential signal $SD_2$ to generate a differential current according to the current generated by the current module 346. The current-to-voltage converter 344 generates a second differential voltage to serve as the processed signal SR according to the differential current generated by the differential pair 345. The variable resistor unit 349 is coupled between the differential pair 345 and the current module 346. The resistance of the variable resistor unit 349 is changed according to the frequency of the output of the differential pair 345. The variable resistor units 348 and 349 can be accomplished by active components or passive components. In one embodiment, the current module 346 includes two current sources. Each current source includes a first terminal coupled to the differential pair 345 and a second terminal receiving the operation voltage $V_{OP2}$. In one embodiment, the operation voltage $V_{OP2}$ is a ground voltage.

The receiving-terminal selecting module 320C provides the setting values $SS_1$ and $SS_2$ to the level-adjustment modules 331C and 332C to indirectly deactivate the differential pair 342 or 345 according to the detection signal $S_D$. In this embodiment, the receiving-terminal selecting module 320C uses one of the voltages V1 and V2 as the setting value $SS_1$ and uses the other of the voltages V1 and V2 as the setting value $SS_2$ according to the detection signal $S_D$. In one embodiment, the receiving-terminal selecting module 320C is a multiplexer.

Figure 3D:
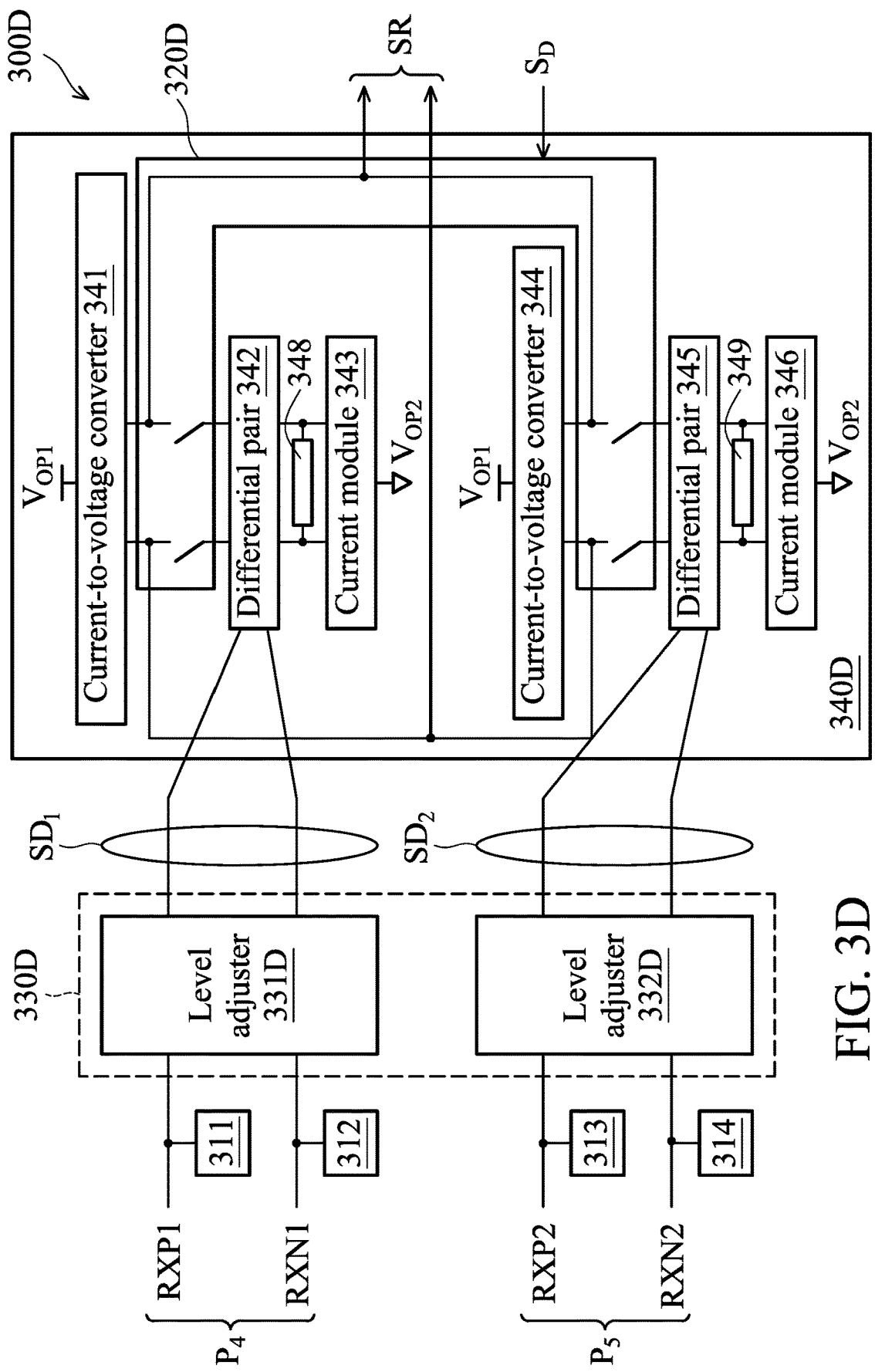

FIG. 3D is a schematic diagram of another exemplary embodiment of the receiving unit, according to various aspects of the present disclosure. The receiving-terminal selecting module 320D is disposed into the variable gain tuning module 340D. Since the operation of the level-adjustment module 330D is the same as the operation of the level-adjustment module 330B, the description of the level-adjustment module 330D is omitted.

In this embodiment, the variable gain tuning module 340D includes current-to-voltage converters 341 and 344, differential pairs 342 and 345, variable resistor units 348 and 349, current modules 343 and 346, and the receiving-terminal selecting module 320D. The current-to-voltage converter 341, the receiving-terminal selecting module 320D, the differential pair 342 and current module 343 are serially connected with one another between the operation voltages $V_{OP1}$ and $V_{OP2}$ to change the gain of the differential signal $SD_1$. The differential pair 342 processes the differential signal $SD_1$. The current module 343 is coupled between the differential pair 342 and the operation voltage $V_{OP2}$. The current-to-voltage converter 341 is coupled between the operation voltage $V_{OP1}$ and the receiving-terminal selecting module 320D.

The receiving-terminal selecting module 320D turns on the paths between the current-to-voltage converter 341 and the differential pair 342 or turns on the paths between the current-to-voltage converter 344 and the differential pair 345 according to the detection signal $S_D$. When the paths between the current-to-voltage converter 341 and the differential pair 342 is turned on, the current-to-voltage converter 341 converts the output signal of the differential pair 342 from a current format into a voltage format to generate the processed signal SR. The variable resistor unit 348 is coupled between the differential pair 342 and the current module 343. The resistance of the variable resistor unit 348 is changed according to the frequency of the output of the differential pair 342. In one embodiment, the current module 343 includes two current sources. Each current source includes a first terminal coupled to the differential pair 342 and a second terminal receiving the operation voltage $V_{OP2}$. In one embodiment, the operation voltage $V_{OP2}$ is a ground voltage. Likewise, the current-to-voltage converter 344, the receiving-terminal selecting module 320D, the differential pair 345 and current module 346 are serially connected with one another between the operation voltages $V_{OP1}$ and $V_{OP2}$ to change the gain of the differential signal $SD_2$. The differential pair 345 processes the differential signal $SD_2$. The current module 346 is coupled between the differential pair 345 and the operation voltage $V_{OP2}$. The current-to-voltage converter 344 is coupled between the operation voltage $V_{OP1}$ and the receiving-terminal selecting module 320D. When the paths between the current-to-voltage converter 344 and the differential pair 345 is turned on, the current-to-voltage converter 344 converts the output signal of the differential pair 345 from a current format into a voltage format to generate the processed signal SR. The variable resistor unit 349 is coupled between the differential pair 345 and the current module 346. The resistance of the variable resistor unit 349 is changed according to the frequency of the output of the differential pair 345. The variable resistor units 348 and 349 are accomplished by active components or passive components. In one embodiment, the current module 346 includes two current sources. Each current source includes a first terminal coupled to the differential pair 345 and a second terminal receiving the operation voltage $V_{OP2}$. In one embodiment, the operation voltage $V_{OP2}$ is a ground voltage.

In this embodiment, the receiving-terminal selecting module 320D is configured to turn on the paths between the current-to-voltage converter 341 and the differential pair 342 or turn on the paths between the current-to-voltage converter 344 and the differential pair 345, but the disclosure is not limited thereto. In some embodiments, the receiving-terminal selecting module 320D is configured to turn on the paths between the differential pair 342 and the current module 343 or turn on the paths between the differential pair 345 and the current module 346. In other embodiments, the receiving-terminal selecting module 320D is configured to turn on the paths between the current-to-voltage converter 341 and the operation voltage $V_{OP1}$ or turn on the paths between the current-to-voltage converter 344 and the operation voltage $V_{OP1}$. In other embodiments, the receiving-terminal selecting module 320D is configured to turn on the paths between the current module 343 and the operation voltage $V_{OP2}$ or turn on the paths between the current module 346 and the operation voltage $V_{OP2}$.

Figure 3E:
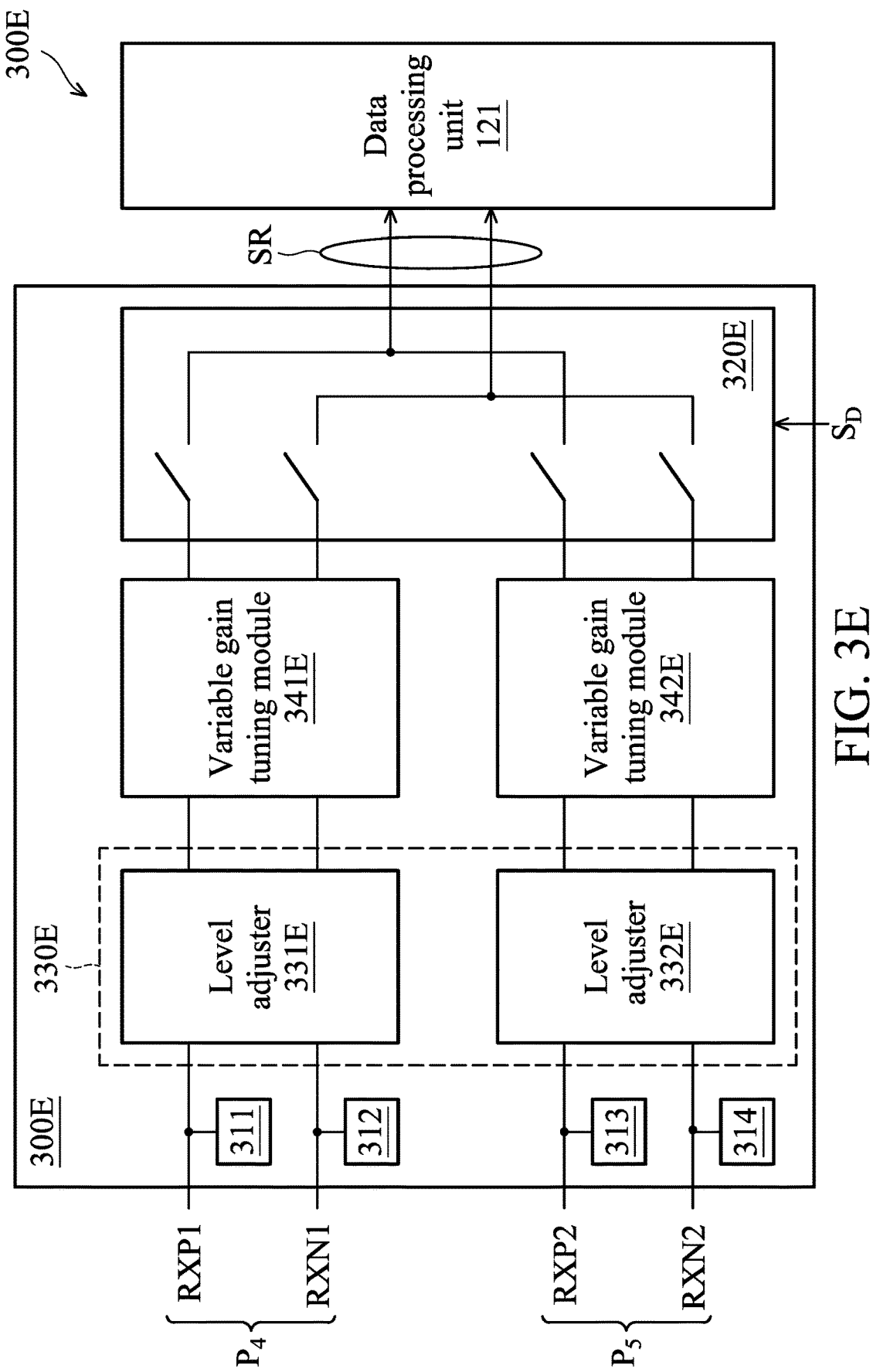

FIG. 3E is a schematic diagram of another exemplary embodiment of the receiving unit, according to various aspects of the present disclosure. In this embodiment, the receiving-terminal selecting module 320E is coupled between the variable gain tuning modules 341E and 342E and the data processing unit 121. As shown in FIG. 3E, the level-adjustment module 330E includes level shifters 331E and 332E. The level shifter 331E adjusts the levels of the common voltages of the signals received by the pin set $P_4$ and provides the adjusted differential signal to the variable gain tuning module 341E. The level shifter 332E adjusts the levels of the common voltages of the signals received by the pin set $P_5$ and provides the adjusted differential signal to the variable gain tuning module 342E.

The variable gain tuning module 341E changes the gain of the output signals provided by the level shifter 331E. The variable gain tuning module 342E changes the gain of the output signals provided by the level shifter 332E. The receiving-terminal selecting module 320E uses the output signals of the variable gain tuning module 341E or 342E as the processed signal SR according to the detection signal $S_D$. In one embodiment, the receiving-terminal selecting module 320E is a multiplexer.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A USB chipset comprising:
    a data processing unit generating a plurality of transmission information according to first information provided by a first device;
    a transmitting unit processing the transmission information to generate an output signal;
    a first pin set configured only to transmit the output signal to a second device;
    a second pin set configured only to transmit the output signal to the second device;
    a third pin set coupled to the second device;
    a fourth pin set coupled to the second device and configured only to receive a first input signal; and
    a fifth pin set coupled to the second device and configured only to receive a second input signal,
    wherein responsive to the first pin set transmitting the output signal to the second device, the second pin set does not transmit the output signal to the second device, and responsive to the second pin set transmitting the output signal to the second device, the first pin set does not transmit the output signal to the second device, and responsive to the fourth pin set receiving the first input signal, the fifth pin set does not receive the second input signal, and responsive to the fifth pin set receiving the second input signal, the fourth pin set does not receive the first input signal.

2. The USB chipset as claimed in claim 1, further comprising:
    a detection unit detecting a level of a voltage received by the third pin set to generate a detection signal, wherein the transmitting unit utilizes the first or second pin set to transmit the output signal according to the detection signal.

3. The USB chipset as claimed in claim 2, further comprising:
a receiving unit processing the first or second input signal according to the detection signal to generate a processed result and providing the processed result to the data processing unit.

4. The USB chipset as claimed in claim 3, wherein the transmitting unit comprises a de-multiplexer, and the receiving unit comprises a multiplexer.

5. The USB chipset as claimed in claim 3, wherein the receiving unit comprises:
a receiving-terminal selecting module coupled to the fourth pin set and the fifth pin set to selectively output signals received by the fourth or fifth pin set according to the detection signal; and
a level-adjustment module configured to adjust a level of a common voltage of the output signal of the receiving-terminal selecting module.

6. The USB chipset as claimed in claim 5, wherein the level-adjustment module is a high pass filter.

7. The USB chipset as claimed in claim 5, further comprising:
a variable gain tuning module adjusting the outputs of the level-adjustment module to generate the processed signal.

8. The USB chipset as claimed in claim 7, wherein the variable gain tuning module is an equalizer.

9. The USB chipset as claimed in claim 7, wherein the variable gain tuning module is a variable gain amplifier.

10. The USB chipset as claimed in claim 3, wherein the receiving unit comprises:
a level-adjustment module coupled to the fourth pin set and the fifth pin set, adjusting levels of common voltages of signals received by the fourth pin set to generate a first differential signal, and adjusting levels of common voltages of signals received by the fifth pin set to generate a second differential signal; and
a receiving-terminal selecting module selectively providing the first or second differential signal to a variable gain tuning module according to the detection signal.

11. The USB chipset as claimed in claim 3, wherein the receiving unit comprises:
a first level-adjustment module coupled to the fourth pin set and adjusting levels of common voltages of signals received by the fourth pin set according to a first setting value to generate a first differential signal;
a second level-adjustment module coupled to the fifth pin set and adjusting levels of common voltages of signals received by the fifth pin set according to a second setting value to generate a second differential signal; and
a receiving-terminal selecting module coupled to the first and second level-adjustment modules to provide the first setting value to the first level-adjustment module and provide the second setting value to the second level-adjustment module according to the detection signal.

12. The USB chipset as claimed in claim 11, further comprising:
a variable gain tuning module coupled to the first and second level-adjustment modules, wherein when a level of a common voltage of the first differential signal is equal to a pre-determined value, the variable gain tuning module does not adjust the first differential signal, and when the level of the common voltage of the first differential signal is not equal to the pre-determined value, the variable gain tuning module adjusts the first differential signal.

13. The USB chipset as claimed in claim 12, wherein first level-adjustment module uses the first setting value as the level of the common voltage of the first differential signal.

14. The USB chipset as claimed in claim 3, wherein the receiving unit comprises:
a level-adjustment module coupled to the fourth pin set and the fifth pin set, adjusting levels of common voltages of signals received by the fourth pin set to generate a first differential signal, and adjusting levels of common voltages of signals received by the fifth pin set to generate a second differential signal; and
a variable gain tuning module selectively adjusting the first or second differential signal to generate the processed result.

15. The USB chipset as claimed in claim 14, wherein the variable gain tuning module comprises:
a first differential pair coupled to the level-adjustment module to receive and process the first differential signal and generate a first output signal set;
a first current module coupled between the first differential pair and a first operation voltage;
a first variable resistor unit coupled to the first differential pair and the first current module;
a first current-to-voltage converter coupled between a second operation voltage and a receiving-terminal selecting module and converting the first output signal set to generate a first processed signal;
a second differential pair coupled to the level-adjustment module to receive the second differential signal and generate a second output signal set;
a second current module coupled between the second differential pair and the first operation voltage;
a second variable resistor unit coupled to the second differential pair and the second current module; and
a second current-to-voltage converter coupled between the second operation voltage and the receiving-terminal selecting module and converting the second output signal set to generate a second processed signal,
wherein the receiving-terminal selecting module is configured to direct the first current-to-voltage converter to convert the first output signal set according to the detection signal or direct the second current-to-voltage converter to convert the second output signal set according to the detection signal.

16. The USB chipset as claimed in claim 15, wherein the data processing unit generates receiving information to the second device according to the first or second processed signal.

17. The USB chipset as claimed in claim 15, wherein the first variable resistor unit has a resistance which is changed according to the frequency of the first output signal set.

18. The USB chipset as claimed in claim 3, wherein the receiving unit comprises:
a level-adjustment module coupled to the fourth pin set and the fifth pin set, adjusting levels of common voltages of signals received by the fourth pin set to generate a first differential signal, and adjusting levels of common voltages of signals received by the fifth pin set to generate a second differential signal;
a plurality of variable gain tuning modules adjusting the first and second differentials to generate a first processed signal and a second processed signal; and a receiving-terminal selecting module transmitting the first or second processed signal to the data processing unit according to the detection signal.

19. The USB chipset as claimed in claim 18, wherein the data processing unit generates receiving information to the second device according to the first or second processed signal.

\* \* \* \* \*